UNITED STATES PATENT OFFICE.

LEWIS C. HARVEY, OF JACKSON, MICHIGAN, ASSIGNOR OF ONE-HALF HIS RIGHT TO JOHN McARDLE, OF CLEVELAND, OHIO.

IMPROVEMENT IN STOVE-POLISH.

Specification forming part of Letters Patent No. 187,378, dated February 13, 1877; application filed January 30, 1877.

*To all whom it may concern:*

Be it known that I, LEWIS C. HARVEY, of Jackson, in the county of Jackson and State of Michigan, have invented a new and Improved Stove-Polish; and I do hereby declare that the following is a full and exact description of the same.

The object of my invention is the production of a polish for stoves which can be applied more conveniently than that now commonly used; will produce a polish of greater brilliancy and retain such polish for a longer period of time; and it consists in the compound composed of English plumbago, German plumbago, common bar-soap, brown sugar, and turpentine, mixed with water to the proper consistency.

In the preparation of my polish I take of English plumbago, eight pounds; German plumbago, four pounds; common bar soap, one-fourth pound; common brown sugar, one-fourth pound; turpentine, three and one-fourth pounds.

These ingredients are thoroughly stirred together, and sufficient warm water added to make the compound of about the consistency of a thick paste.

I have designed to put this compound in proper tin boxes for transportation and use. It will always retain its liquid form, and will never become hard; therefore it can be used much more conveniently than the ordinary polish, since no mixing is required. I have found in the use of my compound that it possesses many advantages over the polish heretofore used, since less labor is required to obtain the same brilliancy of polish, a greater brilliancy is possible, and the polish will be retained for a longer time.

Having thus fully described my invention, what I claim as new therein, and desire to secure by Letters Patent, is—

The stove-polish described, consisting of English plumbago, German plumbago, bar-soap, sugar, and turpentine, prepared in about the proportions set forth.

This specification signed and witnessed this 11th day of January, 1877.

LEWIS C. HARVEY.

Witnesses:
 H. H. NEWTON,
 O. G. GETZEN-DANNER.